United States Patent [19]

Jones et al.

[11] Patent Number: 5,442,001
[45] Date of Patent: Aug. 15, 1995

[54] USE OF LOW TOXICITY SOLVENTS IN WATERBORNE ADHESIVES

[75] Inventors: M. Erin Jones, Yardley, Pa.; Paul P. Puletti, Pittstown, N.J.

[73] Assignee: National Starch and Chemical Investment Holding Corporation, Wilmington, Del.

[21] Appl. No.: 301,470

[22] Filed: Sep. 7, 1994

Related U.S. Application Data

[63] Continuation-in-part of Ser. No. 121,008, Sep. 14, 1993, abandoned.

[51] Int. Cl.$^6$ .......................... C08K 5/06; C08K 5/01; C09J 133/10; C09J 133/08; C09J 133/02
[52] U.S. Cl. .................. 524/292; 427/208.8; 427/334; 427/411; 427/416; 428/346; 428/355; 428/484; 428/486; 428/514; 524/274; 524/315; 524/376; 524/377; 524/482; 524/487; 524/490; 524/491; 524/503; 524/755; 524/773; 524/832; 524/819
[58] Field of Search ............... 524/292, 274, 315, 376, 524/377, 482, 503, 490, 491, 487, 755, 773, 832, 819; 428/346, 355, 484, 486, 514; 427/208.8, 334, 411, 416; 523/335

[56] References Cited

U.S. PATENT DOCUMENTS

| | | | |
|---|---|---|---|
| 3,305,383 | 2/1967 | Gordy | 427/416 |
| 3,513,114 | 5/1970 | Hahn et al. | 260/8 |
| 3,668,158 | 6/1972 | Keithley | 260/17 |
| 3,746,679 | 7/1973 | Seipel | 260/29.6 |
| 4,740,546 | 4/1988 | Masuda | 524/819 |
| 4,818,779 | 4/1989 | Witucki et al. | 524/188 |
| 4,963,611 | 10/1990 | Nagasawa et al. | 524/459 |
| 4,975,481 | 12/1990 | Tamm et al. | 524/317 |
| 5,064,713 | 11/1991 | DuLaney et al. | 428/214 |
| 5,100,944 | 3/1992 | Walker et al. | 524/306 |

OTHER PUBLICATIONS

The Courier-News Business Section, p. C-4 Tuesday, Dec. 1, 1992.
Chemical Week, Dec. 16, 1992, p. 40 "Food Flavoring Replaces Trichloroethane".

*Primary Examiner*—Veronica P. Hoke
*Attorney, Agent, or Firm*—William K. Wissing

[57] ABSTRACT

The use of $C_1$-$C_5$ alkyl butyrates, d-limonene, ethylene glycol monobutyl ether and $C_5$-$C_{20}$ petroleum distillates and normal paraffins in place of methyl chloroform (1,1,1-trichloroethane) in conventional waterborne packaging and converting adhesives provides comparable or better adhesive products with reduced environmental and health related problems.

29 Claims, No Drawings

USE OF LOW TOXICITY SOLVENTS IN WATERBORNE ADHESIVES

This application is a continuation-in-part of application Ser. No. 08/121,008, filed Sep. 14, 1993.

FIELD OF THE INVENTION

This invention pertains to waterborne adhesives suitable for use on waxy substrates.

BACKGROUND OF THE INVENTION

The packaging adhesive area has traditionally been dominated by waterborne adhesives based on polyvinyl acetate homo-, co- or terpolymer dispersions. In many of these packaging applications, organic or inorganic solvents are added to enhance the ability of the waterborne adhesive to "wet-out" and penetrate the substrate, thereby improving adhesion. Halogenated solvents, and particularly methyl chloroform (1,1,1-trichloroethane), are most commonly used for these purposes, however, their potential environmental and health related effects have resulted in a search for a satisfactory alternative solvent. Recently U.S. Pat. No. 5,100,944 disclosed the effectiveness of ethylene glycol diacetate as a substitute to methyl chloroform to wet out and penetrate substrates. However, this solvent is not completely effective as a penetrant on waxy substrates.

SUMMARY OF THE INVENTION

It has now been found that when certain organic solvents, such as lower alkyl butyrates, d-limonene, ethylene glycol monobutyl ether and certain hydrotreated low molecular weight petroleum distillates and normal paraffins, are used in waterborne packaging and converting adhesives, improved penetration and wetting out of waxy substrates are obtained yielding adhesive properties comparable to or better than those achieved with methyl chloroform. Thus, the present invention is directed to waterborne packaging and converting adhesives comprising:

A) a mixture containing:
  a) a dispersion of a polymer selected from the group consisting of vinyl acetate and all-acrylic polymers, the dispersion being present in an amount effective to impart adhesive properties required for use as a packaging or converting adhesives;
  b)
    i) 0 to 20 parts by weight plasticizer;
    ii) 0 to 10 parts by weight polyvinyl alcohol;
    iii) 0 to 20 parts by weight tackifier;
    iv) 0 to 20 parts by weight filler;
    v) 0 to 20 parts by weight humectant;
    vi) 0 to 20 parts by weight of mixtures of i–v;
    vii) 0 to 25 parts by weight thickener;
B) 1 to 35 parts by weight of an organic solvent selected from the group consisting of the $C_1$–$C_5$ alkyl butyrates, d-limonene, ethylene glycol monobutyl ether, and $C_5$–$C_{20}$ aliphatic hydrocarbon petroleum distillates and normal paraffins.

DETAILED DESCRIPTION OF THE INVENTION

Suitable specific solvents are methyl butyrate, ethyl butyrate, propyl butyrate, n-butyl butyrate, pentyl butyrate, d-limonene, ethylene glycol monobutyl ether, and those petroleum distillates and normal paraffins sold by Exxon Corporation under the Actrel tradename, such as, Actrel ™ 1111L, 1160L, 1171L, 4493L, 3349L, and 3360L. Of the petroleum distillates, the preferred are the odorless 3349L, 1111L and 1160L. When a low flammability rating is desired, 1111L is more preferred; when a fast penetrant is required, 3349L is more preferred.

The specified solvents may be used with any conventional waterborne vinyl acetate or all-acrylic based packaging or converting adhesive formulation. Surprisingly, it has been, found that the organic solvents utilized in the inventive adhesives may be used at substantially lower levels than would be required with methyl chloroform (1,1,1-trichloroethane) to achieve comparable performance in the same adhesive system when applied to waxy substrates. By waxy substrate it is meant that the substrates have been coated with a wax material where at least one of the following properties is desired: moisture barrier, water resistance, grease resistance, abrasion resistance or chemical resistance. An exemplary wax material is paraffin. Waxy substrates, as used herein, are not intended to include those substrates coated with polymeric materials which have been modified with low levels of wax components, such as styrene/acrylic or polyethylene materials modified with wax emulsions. Although the inventive adhesives exhibit adhesion to nonwaxy substrates which is comparable to or better than conventional packaging and converting adhesives, the advantages of the inventive adhesives are realized best when used to bond waxy substrates.

The precise formulation of the adhesives will vary depending upon the specific end use. In general, the adhesives will comprise dispersions of vinyl acetate or all-acrylic polymers. The vinyl acetate polymers may be a polyvinyl acetate homopolymer, or copolymers or terpolymers of vinyl acetate with up to 80% of other ethylenically unsaturated copolymerizable comonomers. Examples of such comonomers are alpha olefins and the $C_1$–$C_9$ esters of mono- or dicarboxylic acids, particularly those esters of acrylic, methacrylic and maleic acids. Ethylene, 2-ethyl hexyl acrylate, and dibutyl maleate are the most commonly employed comonomers. The all-acrylic polymers are prepared from acrylic monomers, such as acrylic acid, methacrylic acid, $C_1$–$C_{12}$ alkyl esters of acrylic or methacrylic acid, and $C_1$–$C_8$ alkyl-substituted acrylamides and methacrylamides.

The amount of the vinyl acetate or all-acrylic polymer dispersion utilized in the adhesives is effective to impart adhesive properties required for use as a packaging or converting adhesives. The actual amount used will depend on factors such as, for example, the particular polymer used in the dispersion and the particular application for which the adhesive may be used, i.e. substrate type, application, conditions, end-use, etc. One skilled in the art, once armed with the present specification, will be able to ascertain the particular level of polymer dispersion required for the particular conditions and circumstances surrounding the particular application. The vinyl acetate or all-acrylic polymer is generally present in the adhesive in the form of an aqueous dispersion at levels of 20 to 99 parts by weight, preferably from 50 to 90 parts by weight, based on the total weight of the adhesive composition. The polymer dispersion itself will have a solids level of about 50% to 70% by weight, preferably about 55% by weight. Optionally, the vinyl acetate or all-acrylic polymer dispersion may contain polyvinyl alcohol as a protective colloid, or alternatively, polyvinyl alcohol may be added to the waterborne adhesive formulation. If present, the polyvinyl alcohol is used at levels of 0.1 to 10 parts by weight, preferably 0.5 to 5.0 parts by weight of the total adhesive formulation. As alternatives to polyvinyl alcohol, other stabilizers, such as surfactants, cellulosics, for example hydroxy ethyl cellulose, starch or combinations thereof, may be utilized during polymerization.

Other additives traditionally used in packaging adhesives, such as, plasticizers, defoamers, preservatives, thickeners, rheology modifiers, humectants, fillers, and tackifiers, may be utilized in conventional amounts, and water may be added to obtain a desired application viscosity.

If present, one or more of those plasticizers conventionally used in vinyl acetate-based waterborne packaging adhesives may be used in the adhesive formulation. Representative plasticizers include acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether, tributoxyethyl phthalate, triethylene glycol polyester of benzoic acid and phthalic acid. Of these plasticizers, dibenzoate types, phthalates, liquid polyesters or sulfonated types are preferred. The plasticizer is generally used in amounts of 2 to 20 parts by weight, preferably 3 to 15 parts.

If present, tackifiers generally will be used in dispersion form at 40% to 65% solids in amounts up to about 50 parts by weight, preferably 2 to 20 parts. Representative tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamide-formaldehyde resin, and wood rosin.

Suitable thickeners include oliginates, bentonite, casein, fumed silica, guar gum, gum tragacanth, hydroxyethylcellulose, locust bean gum, methylcellulose, polyacrylic acid salts (ammonium, potassium, sodium), polyvinyl alcohol, sodium carboxymethyl cellulose, and starches, and if present, will be used in amounts up to about 25 parts by weight.

Useful fillers include bentonites, calcium carbonate, calcium silicate, clay, mica, nut shell flours, silica, talc, uncooked starches, and wood flour, and if present, will be used in amounts up to about 20 parts by weight.

Suitable humectants include calcium chloride, diethylene glycol, glycerins, hexylene glycol, propylene glycol, magnesium chloride, sodium nitrate, sorbitol, sucrose, and urea, and if present, will be used in amounts up to about 20 parts by weight.

In order to increase the penetrating effects of the adhesive, it is preferred to formulate the adhesive with 0.05 to 5.0 parts by weight of a surfactant. The surfactants may be one or more of anionic, cationic, amphoteric or nonionic surface-active compounds. Suitable anionic emulsifiers are, for example, alkyl sulfonates, alkylaryl sulfonates, alkyl sulfates, sulfates of hydroxylalkanols, alkyl and alkylaryl disulfonates, sulfonated fatty acids, sulfates and phosphates of polyethyoxylated alkanols and alkylphenols, as well as esters of sulfosuccinic acid. Suitable cationic emulsifiers are, for example, alkyl quaternary ammonium salts, and alkyl quaternary phosphonium salts. One type of suitable non-ionic emulsifier is the addition product of 5 to 50 moles of ethylene oxide adducted to straight-chain and branched-chain alkanols with 6 to 22 carbon atoms, or to alkylphenols, higher fatty acids, higher fatty acid amines, or primary and secondary higher alkyl amines. Other suitable nonionic emulsifiers are one or more block copolymers of propylene oxide with ethylene oxide. Preferred surfactants include fluorinated alkyl amphoterics or sodium dioctylsulfosuccinate.

To formulate the adhesive with improved adhesion and penetration to waxy substrates, one or more of the specific disclosed solvents are added to the adhesive in amounts of 1 to 35 parts by weight, preferably 5 to 30 parts by weight, based on the total weight of the adhesive composition. The actual amount of solvent used will depend on the particular solvent chosen and on the particular substrate to which the adhesive is applied. Where the substrates have light wax coatings applied thereto, or have no wax coating applied thereto, the solvent may be used at amounts as low as 1% by weight. Where substrates have heavy wax coatings applied thereto, the solvent is preferably used in amounts of at least 5% by weight. In addition to providing a non-hazardous replacement for methyl chloroform, some of these solvents, for example, Actrel 1111L, 3349L and 1160L, have the added advantage of being odorless, a desirable property in the packaging industry.

The resultant adhesives, when appropriately formulated, may be used in virtually any packaging and converting applications in which waterborne adhesives are commonly employed, including case and carton forming and sealing, tube winding, bag manufacture, glued lap, paper and flexible film laminating. However, the improved adhesion and penetration properties of the inventive adhesives are realized best when the adhesives are used to bond waxy substrates.

Typical waxy substrates include, for example, paraffin wax coated corrugated fiberboard and varying grades of paraffin wax coated paper. Typical examples of articles manufactured from the waxy substrates include, without limitation, paper bags, milk and juice cartons, drinking cups, containers for shipping produce and the like, and other applications where properties such as water resistance, grease resistance, abrasion resistance, chemical resistance, moisture impermeability are desired. The waxy substrates, and accordingly the articles manufactured therefrom, will have applied to a portion thereof the packaging or converting adhesive. Depending on the particular application, the waxy substrate may have substantially all of one surface coated, or may be coated on two sides. Alternately, the adhesive may be applied as a bead, whereby a minor portion of the substrate has applied thereto the adhesive. One skilled in the art, once armed with the present specification, will readily ascertain those applications in which the use of the inventive adhesives would be advantageous. Any conventional method of applying the adhesives to the particular substrates may be employed. These methods are well known in the field of packaging and converting adhesives.

EXAMPLES

Waterborne adhesives suitable for packaging and converting use were prepared with the disclosed solvents/penetrants and tested for improved adhesion and substrate penetration. The test consisted of bonding two substrates with the adhesives, and then pulling apart the bond and checking for degree of fiber tear. A larger percentage of fiber tear represents greater adhesion.

A consistent amount of adhesive to be tested was applied across one substrate using a Bird, wire rod or other applicator to simulate end use application methods and the second substrate was placed on top of the first. Pressure was applied using a hand roller and the bonds were allowed to dry at least 24 hours. The bonds were then pulled apart and degree of fiber tear recorded as a percentage.

Performance of the test adhesives on varying substrates was compared to the performance of control adhesives of the same formulation without the solvent. The test adhesives were also compared to comparative adhesives which utilized ethylene glycol diacetate and 1,1,1-trichloroethane as the solvent of choice. The results are relative to the control on the same substrate, and absolute results varied from day to day depending on ambient conditions in the room.

The adhesives were prepared as follows: Polyvinyl alcohol, when used, was dispersed in water, heated with stirring to 85°–91° C. (185°–195° F.) for one hour or until smooth, and then cooled to below 60° C. (140° F.). One or more commercial polyvinyl acetate or ethylene/vinyl acetate dispersions were added to the polyvinyl alcohol solution with stirring for 30 minutes. Then, sequentially, diethylene glycol dibenzoate as plasticizer, solvent, defoamer, surfactant, and preservative were added. The entire mixture was stirred for one hour and diluted to the desired viscosity with water. When polyvinyl alcohol was not used, the various additives, if present in the formulation, were added sequentially as indicated above, the mixture was stirred for one hour, and diluted to the desired viscosity.

Example I

Adhesive containing n-butyl butyrate

An adhesive, prepared as above and designated sample adhesive I, is based on a standard general packaging adhesive for use on corrugated fiberboards coated with a wax emulsion-modified polyethylene blend. n-Butyl butyrate was the solvent and substrate penetrant. Unless otherwise specified, all parts by weight reported below are based on the total weight of the adhesive formulation. Sample adhesive I had the following composition in parts by weight:

| Water | 5.4 |
|---|---|
| Polyvinyl alcohol | 0.45 |
| Duroset ® C-325 | 45.0 |
| Resyn ® 1025 | 27.0 |
| Plasticizer | 11.7 |
| Defoamer | 0.27 |
| Surfactant | 0.20 |
| Preservative | 0.09 |
| n-Butyl butyrate | 10.0 |
| Water adjustment to 1500 cps | |

Duroset ® C-325 is a polyvinyl acetate dispersion prepared by a continuous polymerization process and available from National Starch and Chemical Company, Bridgewater, N.J. Resyn ® 1025 is a polyvinyl acetate dispersion prepared by a batch polymerization process and available from National Starch and Chemical Company. The plasticizer was a mixture of diethylene, dipropylene, glycol dibenzoate, sold under the tradename Benzoflex 50 by Velsicol Chemical Corporation. The defoamer was a commercial product sold under the tradename Foamaster III/Foamaster B by Henkel Corporation. The surfactant was a commercial product sold under the tradename Aerosol OT 75% by Cytec Industries. The preservative was a commercial product sold under the tradename Kathon LX 1.5% by Rohm & Haas Company.

Sample adhesive I was used to bond solid bleached sulfate (virgin paper fiber bleached white) and Kraft paper to various substrates. The bonds were then tested for degree of fiber tear. A control with the same formulation as adhesive I, without n-butyl butyrate, was tested simultaneously. The results are given in Table I and show that adhesive I, with the addition of n-butyl butyrate, demonstrated improved adhesion and penetration on both waxy and nonwaxy substrates.

TABLE I

Adhesive with and without n-Butyl Butyrate
Percentage Fiber Tear on Various Substrates

| Substrate | Adhesive with Solvent | Adhesive without Solvent |
|---|---|---|
| paraffin wax coated milk carton | 20% | 0 |
| clay, rosin, styrene/acrylate, vinyl acetate/acrylate beer carton | 100% | 90% |
| corrugated fiberboards coated with wax emulsion-modified polyethylene | | |
| *Michelman 50H | 100% | 50% |
| 50A | 100% | 10% |
| 40H | 100% | 50% |

*Products of the Michelman Company, Cincinnati, Ohio.

Example II

Adhesives containing d-limonene and ethylene glycol monobutyl ether for use on wax coated substrates.

A series of adhesives containing ethylene/vinyl acetate dispersions and d-limonene or ethylene glycol monobutyl ether as the solvent and penetrant were prepared as above and designated samples II a, b, c, and d. The samples were used to bond paraffin wax coated paper to a white wood pulp kraft paper and tested for improved adhesion and penetration by checking the wax coated paper for fiber tear. Controls with the same formulations, but without the solvent and penetrant, were tested simultaneously. None of the controls demonstrated any fiber tear. All of the samples demonstrated 100% fiber tear. The compositions of the samples are set out in Table II. The surfactant, preservative and defoamer were the same as in sample I.

TABLE II

Compositions in parts by weight and Adhesion on Waxed Substrates

| Adhesive | II a | II b | II c | II d |
|---|---|---|---|---|
| Water | 10 | 10 | 10 | 10 |
| Polyvinyl alcohol | 2 | 2 | 2 | 2 |
| Ethylene/vinyl acetate | 72 | 77 | 72 | 57 |
| d-Limonene | 15 | 10 | — | — |
| Ethylene glycol monobutyl ether | — | — | 15 | 30 |
| Surfactant | 0.2 | 0.2 | 0.2 | 0.2 |
| Defoamer | 0.2 | 0.2 | 0.2 | 0.2 |
| Preservative | 0.15 | 0.15 | 0.15 | 0.15 |
| % Fiber Tear | 100% | 100% | 100% | 100% |

Example III

Adhesives containing petroleum distillates for use on wax coated substrates.

A series of adhesives containing ethylene/vinyl acetate dispersions with petroleum distillates as the solvent and penetrant were prepared as above and designated samples III a through k. The samples were used to bond paraffin wax coated paper to a white wood pulp kraft paper and tested for improved adhesion and penetration by checking the wax coated paper for fiber tear. Controls with the same formulations, but without the solvent and penetrant, were tested simultaneously. None of the controls demonstrated any fiber tear. All of the samples demonstrated 100% fiber tear. The compositions of the samples are set out in Table III.

TABLE III

Compositions with Petroleum Distillates 100% Fiber Tear on Waxy Substrates

| Sample | Composition parts by weight Solvent | Ethylene/vinyl acetate % solids | Plasticizer | Polyvinyl alcohol | Solvent |
|---|---|---|---|---|---|
| III a | Actrel 1111L | 90 | 0 | | 10 |
| b | Actrel 1111L | 85 | 5 | | 10 |
| c | Actrel 1111L | 85 | | | 15 |
| d | Actrel 1111L | 80 | 5 | | 15 |
| e | Actrel 4493L | 90 | | | 10 |
| f | Actrel 1160L | 90 | | | 10 |
| 9 | Actrel 3360L | 90 | | | 10 |
| h | Actrel 1171L | 90 | | | 10 |
| i | Actrel 3349L | 90 | 5 | | 5 |
| j | Actrel 3349L | 73 | 5 | 2 | 10 |
| k | Actrel 3349L | 68 | 5 | 2 | 15 |

The plasticizer is the same as in sample I. Actrel solvents are tradename solvents available from Exxon Corporation, Houston, Tex. Actrel 1111L, 1160L, and 1171L are hydrotreated $C_9$–$C_{16}$ petroleum distillates with boiling points in the range of 150°–290° C. (302°–554° F.). Actrel 4493L is a combination of normal paraffins and straight chain saturated $C_5$–$C_{20}$ hydrocarbons with boiling points in the range of 35° C.–345° C. (95°–653° F.). Actrel 3360L and 3349L are hydrotreated heavy naphtha (petroleum) $C_6$–$C_{13}$ aliphatic hydrocarbon distillates with boiling points in the range of 65°–230° C. (149°–446° F.).

Example IV

Adhesives containing petroleum distillates for use on wax coated substrates.

A series of adhesives containing ethylene/vinyl acetate dispersions and petroleum distillates as the solvent and penetrant were prepared as above and designated samples IV a through c. Comparative examples utilizing 1,1,1-trichloroethane (TCE) in place of the petroleum distillate as the solvent and penetrant were prepared and designated samples IV d through f. Comparative examples utilizing ethylene glycol diacetate (EGDA) in place of the petroleum distillate as the solvent and penetrant were prepared and designated samples IV g through i. All samples were used to bond paraffin wax coated paper to a white wood pulp kraft paper and tested simultaneously for improved adhesion and penetration by checking the waxed paper for fiber tear. The compositions of the samples and their respective % fiber tear are set out in Table IV.

TABLE IV

Compositions in parts by weight and Adhesion on Waxed Substrates

| Adhesive | IV a | IV b | IV c | IV d | IV e | IV f | IV g | IV h | IV i |
|---|---|---|---|---|---|---|---|---|---|
| Water | 11 | 9.8 | 8.5 | 11 | 9.8 | 8.5 | 11 | 9.8 | 8.5 |
| Polyvinyl alcohol | 2.2 | 2 | 1.7 | 2.2 | 2 | 1.7 | 2.2 | 9.8 | 1.7 |
| Ethylene/vinyl acetate | 74.5 | 66.5 | 57.2 | 74.5 | 66.5 | 57.2 | 74.5 | 66.5 | 57.2 |
| Actrel 3349L | 6.1 | 16.25 | 28 | — | — | — | — | — | — |
| EGDA | — | — | — | — | — | — | 6.1 | 16.25 | 28 |
| TCE | — | — | — | 6.1 | 16.25 | 28 | — | — | — |
| Plasticizer | 5.5 | 4.9 | 4.2 | 5.5 | 4.9 | 4.2 | 5.5 | 4.9 | 4.2 |
| Surfactant | 0.22 | 0.2 | .17 | 0.22 | 0.2 | .17 | 0.22 | 0.2 | .17 |
| Defoamer | 0.22 | 0.2 | .17 | 0.22 | 0.2 | .17 | 0.22 | 0.2 | .17 |
| Preservative | 0.17 | 0.15 | .13 | 0.17 | 0.15 | .13 | 0.17 | 0.15 | .13 |
| Fiber Tear | 100% | 100% | 100% | 0% | 53% | 90% | 10% | 10% | 0% |

A series of adhesives containing ethylene/vinyl acetate dispersions and petroleum distillates as the solvent and penetrant were prepared as above and designated samples V a through d. A comparative example utilizing no solvent was prepared and designated sample V e. All samples were used to bond paraffin wax coated paper to a white wood pulp kraft paper and tested simultaneously for improved adhesion and penetration by checking the waxed paper for fiber tear. The compositions of the samples and their respective % fiber tear are set out in Table V.

TABLE V

Compositions in parts by weight and Adhesion on Waxed Substrates

| Adhesive | V a | V b | V c | V d | V e |
|---|---|---|---|---|---|
| Water | 9.6 | 9.6 | — | — | — |
| Polyvinyl alcohol | 1.9 | 1.9 | — | — | — |
| Ethylene/vinyl acetate | 82 | 82 | 99 | 97 | 100 |
| Actrel 3349L | 1.0 | 3.0 | 1.0 | 3.0 | — |
| Plasticizer | 4.8 | 4.8 | — | — | — |
| Surfactant | 0.2 | 0.2 | — | — | — |
| Defoamer | 0.2 | 0.2 | 0.1 | 0.1 | — |
| Preservative | 0.15 | 0.15 | — | — | — |
| % Fiber Tear | 98% | 100% | 100% | 100% | 0% |

These examples show that the adhesion and penetration of waterborne packaging and converting adhesives can be improved by the addition of specific nontoxic organic solvents, particularly where bonding of waxy substrates is required.

We claim:

1. A waterborne packaging and converting adhesive comprising:
   A) a mixture containing:
   a) a dispersion of a polymer selected from the group consisting of vinyl acetate and all-acrylic polymers, the dispersion being present in an amount effective to impart adhesive properties required for use as a packaging or converting adhesive;
   b)
   i) 0 to 20 parts by weight plasticizer;

ii) 0 to 10 parts by weight polyvinyl alcohol;
iii) 0 to 20 parts by weight tackifier;
iv) 0 to 20 parts by weight filler;
v) 0 to 20 parts by weight humectant; and
vi) 0 to 20 parts by weight of mixtures of i-v;
vii) 0 to 25 parts by weight of thickener; and B) 1 to 35 parts by weight of an organic solvent selected from the group consisting of the $C_1$-$C_5$ alkyl butyrates, d-limonene, ethylene glycol monobutyl ether, and $C_5$-$C_{20}$ aliphatic hydrocarbon petroleum distillates and normal paraffins.

2. The adhesive of claim 1 wherein the polymer is a vinyl acetate homopolymer.

3. The adhesive of claim 1 wherein the polymer is a vinyl acetate copolymer containing up to 80% of other ethylenically unsaturated copolymerizable comonomers selected from the group consisting of alpha olefins, and $C_1$-$C_9$ alkyl esters of mono- or dicarboxylic acids.

4. The adhesive of claim 3 wherein the polymer is an ethylene/vinyl acetate copolymer.

5. The adhesive of claim 1 wherein the polyvinyl alcohol is present in an amount of 0.5 to 5.0 parts by weight.

6. The adhesive of claim 1 wherein the plasticizer is present in amounts of 2 to 20 parts by weight.

7. The adhesive of claim 6 wherein the plasticizer is selected from one or more of the group consisting of acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether and tributoxyethyl phthalate.

8. The adhesive of claim 7 wherein the plasticizer is a mixture of diethylene and dipropylene glycol dibenzoate.

9. The adhesive of claim 1 wherein the tackifier is present in amounts of 2 to 10 parts by weight, the tackifier selected from the group consisting of coumarone-indene, ester gum, gum rosin, hydrocarbon resins, hydrogenated rosin, phenolic modified hydrocarbon resins, rosin esters, tall oil rosins, terpene phenolic, terpene resins, toluenesufonamide-formaldehyde resin, and wood rosin.

10. The adhesive of claim 1 further comprising 0.05 to 5.0 parts by weight of a surfactant.

11. The adhesive of claim 10 wherein the surfactant is a fluorinated alkyl amphoteric or sodium dioctylsulfoccinate.

12. The adhesive of claim 1 wherein the dispersion is present in amounts from 20 to 99 parts by weight.

13. The adhesive of claim 1 wherein the solvent is present in amounts from 5 to 30 parts by weight.

14. An article having applied to a portion thereof a packaging or converting adhesive composition, the adhesive composition comprising:
A) a mixture containing:
a) a dispersion of a polymer selected from the group consisting of vinyl acetate and all-acrylic polymers, the dispersion being present in an amount effective to impart adhesive properties required for use as a packaging or converting adhesives;
b)
i) 0 to 20 parts by weight plasticizer;
ii) 0 to 10 parts by weight polyvinyl alcohol;
iii) 0 to 20 parts by weight tackifier;
iv) 0 to 20 parts by weight filler;
v) 0 to 20 parts by weight humectant; and
vi) 0 to 20 parts by weight of mixtures of i-v;
vii) 0 to 25 parts by weight of thickener; and B) 1 to 35 parts by weight of an organic solvent selected from the group consisting of the $C_1$-$C_5$ alkyl butyrates, d-limonene, ethylene glycol monobutyl ether, and $C_5$-$C_{20}$ aliphatic hydrocarbon petroleum distillates and normal paraffins.

15. The article of claim 14 wherein the polymer is a vinyl acetate homopolymer.

16. The article of claim 14 wherein the polymer is a vinyl acetate copolymer containing up to 80% of other ethylenically unsaturated copolymerizable comonomers selected from the group consisting of alpha olefins, and $C_1$-$C_9$ alkyl esters of mono- or dicarboxylic acids.

17. The article of claim 16 wherein the polymer is an ethylene/vinyl acetate copolymer.

18. The article of claim 14 wherein polyvinyl alcohol is present in an amount of 0.5 to 5.0 parts by weight.

19. The article of claim 14 wherein the plasticizer is present in amounts of 2 to 20 parts by weight.

20. The article of claim 19 wherein the plasticizer is selected from one or more of the group consisting of acetyl tributyl citrate, butyl benzyl phthalate, butyl phthalyl butyl glycolate, dibutyl phthalate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, methyl phthalyl ethyl glycolate, polyoxyethylene aryl ether and tributoxyethyl phthalate.

21. The adhesive of claim 20 wherein the plasticizer is a mixture of diethylene and dipropylene glycol dibenzoate.

22. The article of claim 14 wherein the tackifier is present in amounts of 2 to 10 parts by weight, the tackifier selected from the group consisting of coumarone-indene, ester gum, gum rosin, hydrocarbon resins, hydrogenated rosin, phenolic modified hydrocarbon resins, rosin esters, tall oil rosins, terpene phenolic, terpene resins, toluenesufonamide-formaldehyde resin, and wood rosin.

23. The article of claim 14 further comprising 0.05 to 5.0 parts by weight of a surfactant.

24. The article of claim 23 wherein the surfactant is a fluorinated alkyl amphoteric or sodium dioctylsulfoccinate.

25. The article of claim 14 wherein the dispersion is present in amounts from 20 to 99 parts by weight.

26. The article of claim 14 wherein the solvent is present in amounts from 5 to 30 parts by weight.

27. The article of claim 14 comprising a waxy substrate.

28. The article of claim 27 selected from the group consisting of paraffin-coated paper bags, cartons, drinking cups, and containers.

29. A method for improving the adhesion of an aqueous based polyvinyl acetate or wholly polyacrylic packaging or converting adhesive to a waxy substrate, the method comprising adding to the adhesive 1 to 35 parts by weight of an organic solvent selected from the group consisting of the $C_1$-$C_5$ alkyl butyrates, d-limonene, ethylene glycol monobutyl ether, and $C_5$-$C_{20}$ aliphatic hydrocarbon petroleum distillates and normal paraffins.

* * * * *